United States Patent [19]
Henrekson

[11] 3,910,404
[45] Oct. 7, 1975

[54] CONVEYING MEANS

[76] Inventor: Ulf Henrekson, Fridhemsgatan 17, S-442 00 Kungalv, Sweden

[22] Filed: Feb. 28, 1974

[21] Appl. No.: 446,930

[30]  Foreign Application Priority Data
Mar. 1, 1973  Sweden .............................. 7302873

[52] U.S. Cl. ................ 198/130; 198/189; 198/195; 74/250 C
[51] Int. Cl.² .......................................... B65G 17/00
[58] Field of Search .......... 198/130, 151, 175, 176, 198/189, 195; 74/243 R, 243 C, 245 R, 245 C, 250 R, 250 C, 238

[56]  References Cited
UNITED STATES PATENTS

| | | |
|---|---|---|
| 1,865,879 | 7/1932 | Newhouse .......................... 198/176 |
| 2,944,660 | 7/1960 | Johnston ............................. 198/195 |
| 3,026,737 | 3/1962 | Berg ..................................... 74/238 |
| 3,338,380 | 8/1967 | Grebe ................................. 198/189 |
| 3,754,636 | 8/1973 | Boy ..................................... 198/175 |
| 3,788,455 | 1/1974 | Dieckmann ......................... 198/189 |

*Primary Examiner*—Richard A. Schacher
*Assistant Examiner*—Joseph E. Valenza

[57]  ABSTRACT

The present invention relates to conveying means comprising a preferable endless single cable means and a number of elements attached to form a row thereon, which elements are provided to transport the objects intended to be transported, to guide the conveying means and to cooperate with driving means for the same. The cable means is provided to be deflected and torsioned in all directions forming a connection between the elements which allows them to be deflected in all directions in relation to each other.

1 Claim, 6 Drawing Figures

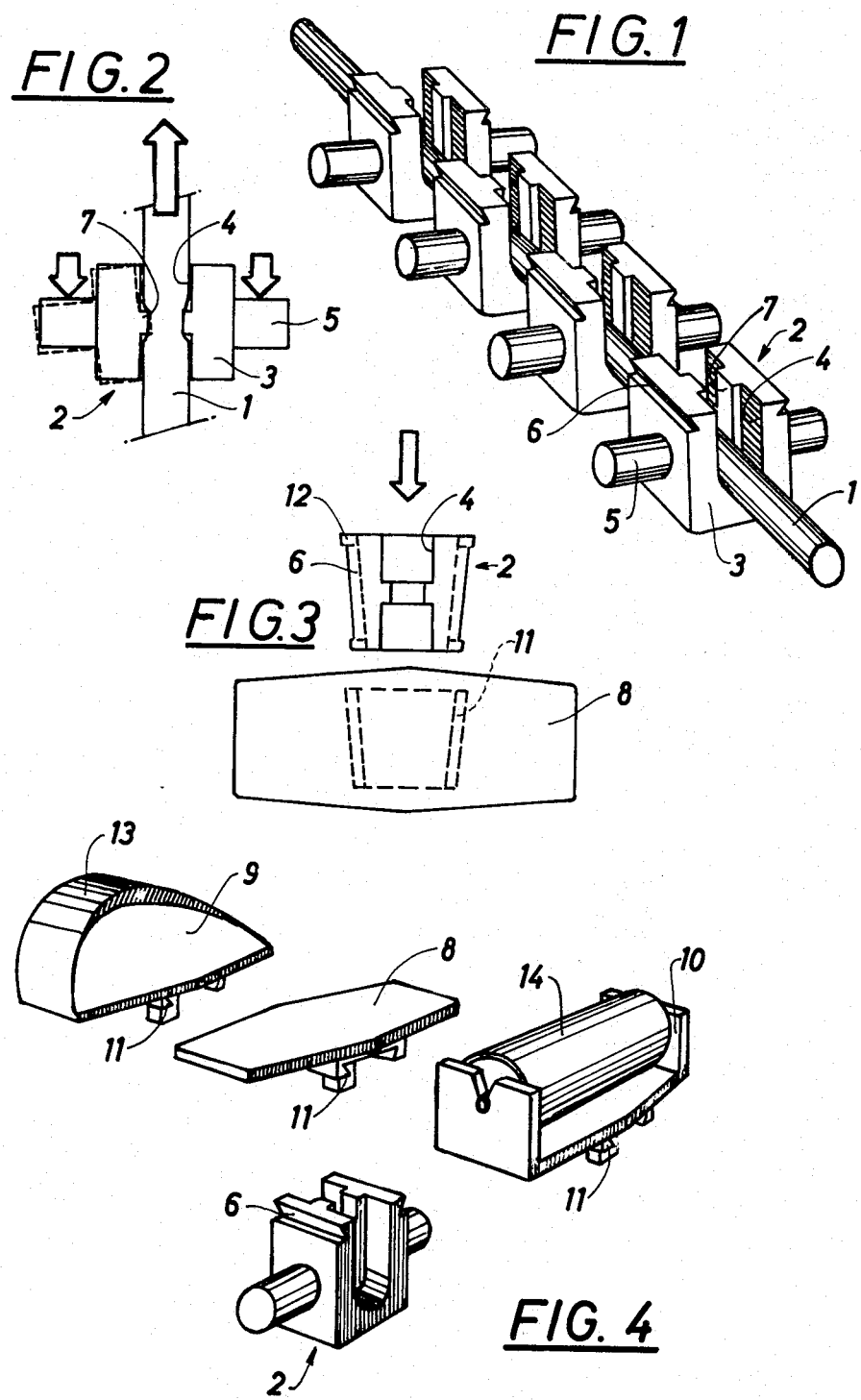

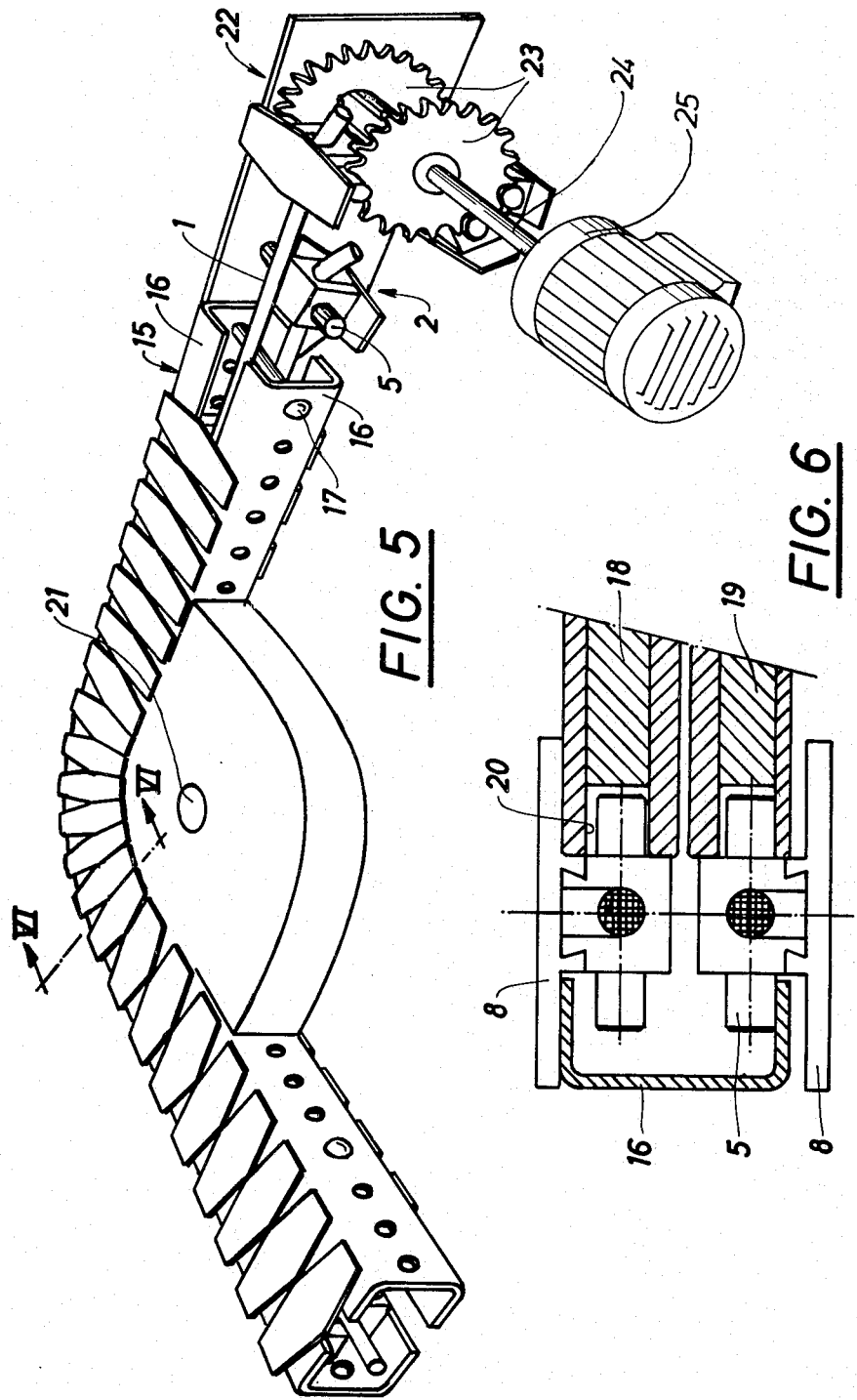

3,910,404

CONVEYING MEANS

The present invention relates to conveying means comprising a number of elements connected to each other in a row, which elements are arranged to be driven and guided in a path and provided to transport objects in said path.

By conveying means of conventional type the travelling means exhibits the shape of a belt or a chain. A belt is quite suitable for the transportation of goods in bulk, but when case-goods shall be transported by means of certain holding devices or similar the belt is less suited because of the fact that such holding devices are difficult to attach onto the beltstructure. Belts also suffer from the drawback that they are flexible in one single plane only. Thus it is impossible to lay out curves unless the conveyor track is not sloped, which can be arranged only exceptionally. Most chains exhibit the same drawback; it is not possible to pull them through plane curves. It is true that there are chains with double link shafts crossing each other, but these chains known are complicated to their design and not very advantageous and they are also volominous and expensive to manufacture.

It is an object of the present invention to provide a conveying means, which means exhibits a great flexibility and which can be deflected in all directions.

In connection with the means according to the invention, additional advantages can be obtained by a great versatility in its adaptation to different purposes of transportation, and also a simple, robust and inexpensive design.

The object of the invention is reached by an element to which said elements are connected by means of a single elongated organ, preferably a cable extending through the row of elements, which organ is provided to be deflected and torsioned in all directions, forming a connection between the elements which allows them to be deflected in all directions relative to each other.

An embodiment of the invention is illustrated in the accompanying drawings and will now be described with reference to them. In the drawings FIG. 1 illustrates a perspective view of the conveying means in not quite complete condition, FIG. 2 is a partial view of the means according to FIG. 1.

FIG. 3 is a detail of an element of the means with a supplementary detail belonging thereto, FIG. 4 illustrates a perspective view of the detail according to FIG. 3 with three different supplementary details, FIG. 5 shows in perspective a cross section through a conveyor track with means according to the invention, and FIG. 6 illustrates a cross sectional view through the track along the line VI—VI in FIG. 5.

According to FIG. 1 the conveying means comprises two principal components: a flexible cable 1 of preferably circular cross section and attached thereto element 2 for loadcarrying and guiding. The elements 2 exhibit a cube-shaped main portion 3 with a groove 4 for the cable 1. Pins 5 are projecting from the outer sides opposed to the sides in which the groove ends and at the opening of the groove 4 a dovetail-shaped portion 6 serving the purpose of mounting means. As is clearly evident from FIG. 2 the groove 4 exhibits two opposed extensions 7, which clamp round the cable 1 and hold the element 2 in the position in which it has been mounted. The portion 6 is intended for the support of supplementary details by way of example the details 8, 9 or 10 according to FIGS. 3, 4. These details at one of their sides are provided with a portion 11 corresponding to the portion 6. As is evident from FIG. 3 the portions 6, 11 are wedge shaped and the portion 6 at its end exhibits nibs 12 intended to spring out outside the end of the portion 11 when it is attached so that the details 8, 9, 10 respectively are kept in place.

As to the supplementary details the one indicated at 8 is shaped to form a plate and it has a general use for transportation of objects, suitable to be placed on the conveyor. The detail 9 is intended to support hooks, by way of example on clothes-hangers for the transportation of hanging objects. For this purpose the detail is provided with an upper rounded surface 13. The detail 10 has a rotatable roller 14, and it is intended to permit storage on a travelling conveyor. Normally objects are brought along standing on rollers 14 following upon each other, but if the forwards motions is obstructed for example by a stop bar, the conveyor can continue its movement, the rollers 14 rolling forwards against the underside of the still standing objects.

For a conveyor the conveying means according to the invention has to be of the endless type, and according to previous descriptions it comprises a cable 1 and along the same the necessary number of elements 2 with such supplementary elements, for example 8, 9 or 10, which are suitable for the intended purpose and the objects intended to be transported. In order to obtain an endless element the ends of the cable have to be joint in some way, which can be made by means of conventional methods; by a solid cable of plastic material, for example polypropylene, it is possible to weld the ends together, in case of a rubber cable vulcanization can be used, and a wire can be spliced. However, also the elements 2 may be used for the jointing in such a way that by a solid cable the ends will be halved and laid one upon the other and locked together by clamping in a number of elements 2 following upon each other. By means of a special jointing element with several extensions like the extension 7 it is possible to splice the cable end to end.

In addition to the mentioned endless conveying means a guiding track 15 is required for a conveyor, said track comprising two U-rails 16 with their openings facing each other and placed at a certain distance from each other, said U-rails being connected by means of a number of distance elements provided with bolts or rivets 17. The sides of the guiding track 15, shaped by the flanges of the U-rails, as shown in FIG. 5, can extend horizontally, but they can also occupy another position. For example in order to throw off the transported objects the track can be inclined along a certain distance, which is permitted by the means according to the invention due to its flexible design.

The track can also extend in plane or sloping curves. In case of sharp curves, however, it may be of advantage, if the curve is provided with deflecting wheels as in connection with the curve in FIG. 5. The arrangement is illustrated in cross section in FIG. 6 and from this figure also the function of the guiding track is evident more in detail. The guiding track 15, as mentioned, comprises two U-rails 16, one of which is illustrated in FIG. 6. In the guiding track the forward part as well as the return part of the travelling means can be accommodated with the forward part sliding against the top side of the guiding track with the underside of the attached supplementing element 8, according to FIG. 6. The return part on the other side slides against the inside of the guiding bar with its pins 5. By the return movement of the elements 2 are traveling with the supplementing element turned downwards. The bolts or rivets 17 mentioned extend between the U-rails 16 in the interspace between the upper forward part and the lower return part.

In the curve illustrated in cross section in FIG. 6 one of the U-bars is substituted by two wheels 18, 19 with grooves 20. The wheels can pivot round a vertical shaft 21 according to FIG. 5.

As is evident from FIG. 5 a driving wheel with double gears 23 is arranged for the driving of the conveying means 1, 2 which gears are arranged to engage the pins 5 of the elements 2. Standard wheels for roller chains can suitably be used, and as is evident from FIG. 5 every second gap of tooth is utilized in that connection. In FIG. 5 for the sake of surveyability some of the elements 2 have been omitted. The wheel 22 by means of a shaft 24 is driven from a reduction gear electric motor 25. At the other end of the conveyor the element 1, 2 travels in a loop round a return deflection wheel, not shown, of the same design as the wheel 22. The return wheel, however, does not need to be driven.

By the design given to the conveying means 1, 2 according to the invention, a very great movability is obtained in all directions for the individual link elements 2 by maintaining a good driving and guiding condition comparable to the ones used in conventional link chains. By the high tensile strength, which can be obtained using modern synthetic materials the element can obtain the necessary strength for transportation purposes, as the whole traction force is taken up by the cable or the wire 1. The manufacture of the element can take place with modern rational methods, and by employing a small number of injection moulding dies the different details, which permit great possibilities of adaptation for different uses for the element, can be manufactured in plastics at low cost. It is simple to carry out the mounting and the locking between the bodies 2 and the cable 1 is made in the simplest possible manner. From FIG. 2 it is evident how a driving force from the driving wheel attacking the pins 5, in case of great reaction force in the cable 1 produces a bending of the element 2, which results in an increase of the clamping force. A sliding of the elements 2 along the wire 1 is therefore eliminated.

I claim:

1. A conveyor comprising a single flexible resilient cable provided with a plurality of spaced u-shaped resilient members securely affixed thereto and adapted to receive means on the open end of each said member for providing a conveying surface, said u-shaped member being in the form of a trough having on each side thereof an inwardly extending central portion adapted to grip said cable in frictional engagement, said members being further provided with opposed pins extending outwardly from each side thereof and transversely with respect to said cable, driving means comprising a pair of power operated wheels having slots to engage respectively the opposed pins on said u-shaped members, and means for guiding said members in a continuous manner.

* * * * *